Patented Nov. 18, 1952

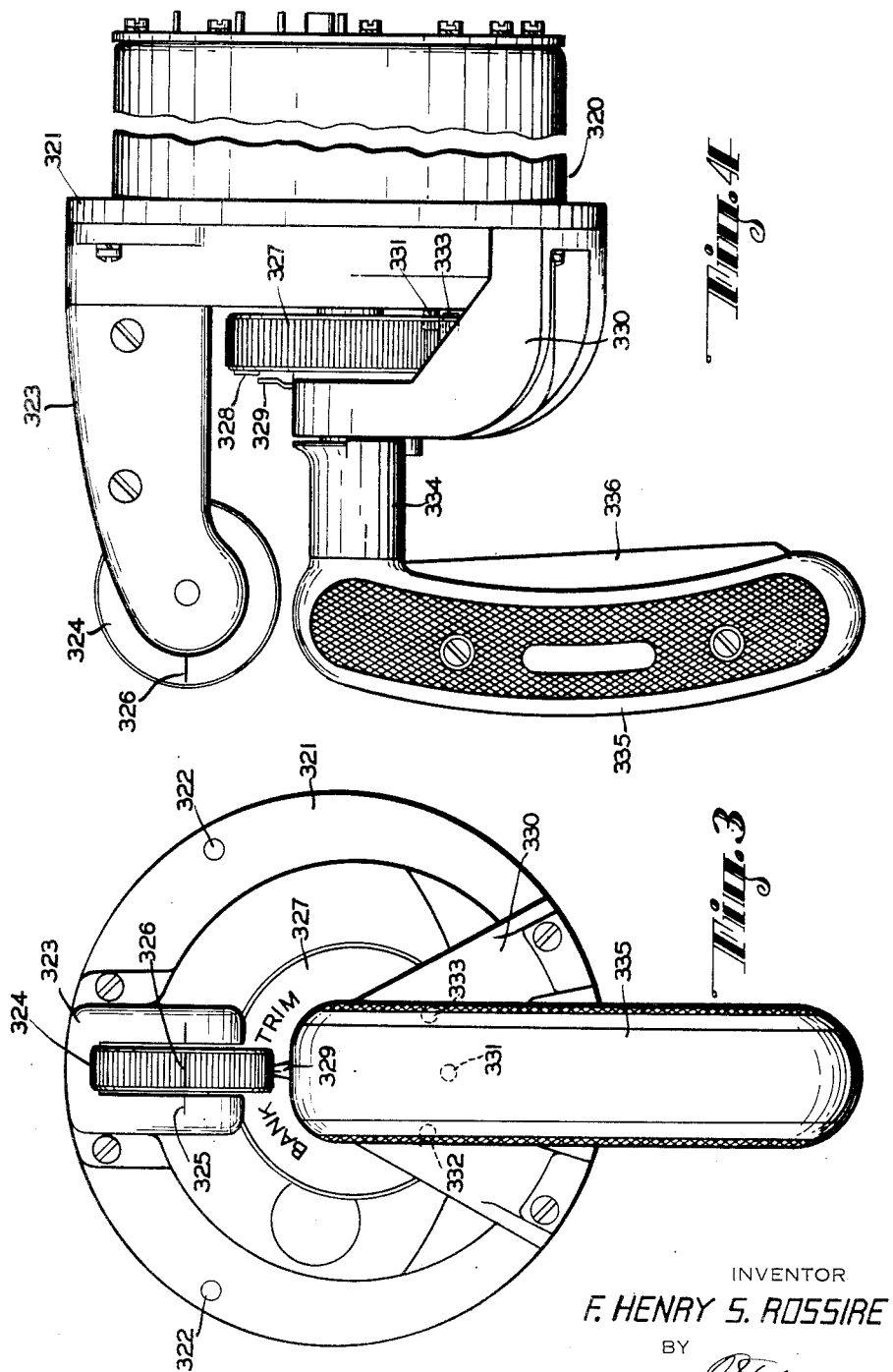

2,618,446

UNITED STATES PATENT OFFICE 2,618,446

CONTROLLER UNIT

F. Henry S. Rossire, Leonia, N. J., assignor to Bendix Aviation Corporation, Teterboro, N. J., a corporation of Delaware Application April 29, 1946, Serial No. 665,918

14 Claims. (Cl. 244—77)

This invention relates generally to automatic pilot or steering systems for mobile craft and more particularly to novel automatic trim and/or turn provisions therefor and as such constitutes an improvement over the automatic trim and/or turn control unit of copending application Serial No. 604,861 filed July 13, 1945, now U. S. Patent No. 2,516,641, issued July 25, 1950.

An object of the present invention is to provide a novel, improved and simplified control unit for automatic steering systems.

Where previously, as represented by the control unit of the aforementioned application, the pitch trim and bank trim knobs were arranged for motion about parallel fore and aft craft axes, in the unit of the present invention the bank trim knob only is mounted on the controller for motion about an axis parallel with the fore and aft axis, while the pitch trim knob is mounted on the controller for motion about a transverse axis, i. e., one parallel with the axis of oscillation of the elevator which it controls so that movement of the pitch trim knob toward the operator will provide an up-elevator condition while a reverse motion of the knob will provide a down-elevator condition. Thus, the novel arrangement hereof is of considerable importance to the human pilot since movement by him of the pitch trim knob will be the same as the movement imposed on the elevator by a conventional control column utilized in mobile craft.

Another object of the present invention, therefore, is to provide a novel controller unit for automatic steering systems for mobile craft wherein each control, i. e., pitch trim, bank trim and automatic turn is angularly displaceable about an axis parallel with the axis of movement of the related control surface or surfaces. For example, pitch trim control is accomplished by adjustment about an axis parallel to the craft transverse axis, bank trim control is accomplished by adjustment about an axis parallel to the craft fore and aft axis, while automatic turn is provided through a handle pivoted for angular displacement about the craft fore and aft axis or the axis of craft turn.

Furthermore, in the controller unit of the aforementioned application, a switching mechanism was provided for disconnecting the compass from the rudder channel operable in response to the displacement of the controller unit turn knob so that a time lag was developed between aileron and rudder response to turn signals tending toward uneven craft flight. With the unit of the present invention, on the other hand, the handle for automatic turn control is provided with a trigger mechanism which is grasped by the pilot at the time of handle displacement so that aileron and rudder channels respond substantially simultaneously to the generated turn signals whereby smoother craft flight is acquired thereby. Moreover, as a result of such novel arrangement more accurate rudder trim or course setting is available.

A further object of the invention, therefore, is is to provide a novel automatic turn control mechanism for automatic steering systems whereby smoother craft flight control is provided thereby than that heretofore available and whereby more accurate rudder trim is possible.

With the controller unit of the present invention, the amount of gearing heretofore required has been reduced to a minimum eliminating thereby lost motion between the controls and the related signal generators, back lash, etc.

Another object of the invention is to provide a novel controller unit for an aircraft automatic pilot whereby in response to manual adjustments of controls on the front of the unit, pitch, bank and rudder signals can be modified and the craft made to execute coordinated maneuvers while with the turn adjustments centered the craft will assume straight flight.

The above and other objects and advantages of the present invention will appear more fully hereinafter from a consideration of the detailed description which follows, taken together with the accompanying drawings wherein one embodiment of the invention is illustrated.

In the drawings wherein like reference characters refer to like parts throughout the several views:

Figure 3 is a front elevation view of one practical embodiment of the control panel for operating the automatic trim and/or turn mechanism; and, Figure 4 is a side elevation view of the turn panel of Figure 3 illustrating the arrangement of the turn, bank and pitch knobs thereon.

Figure 1:
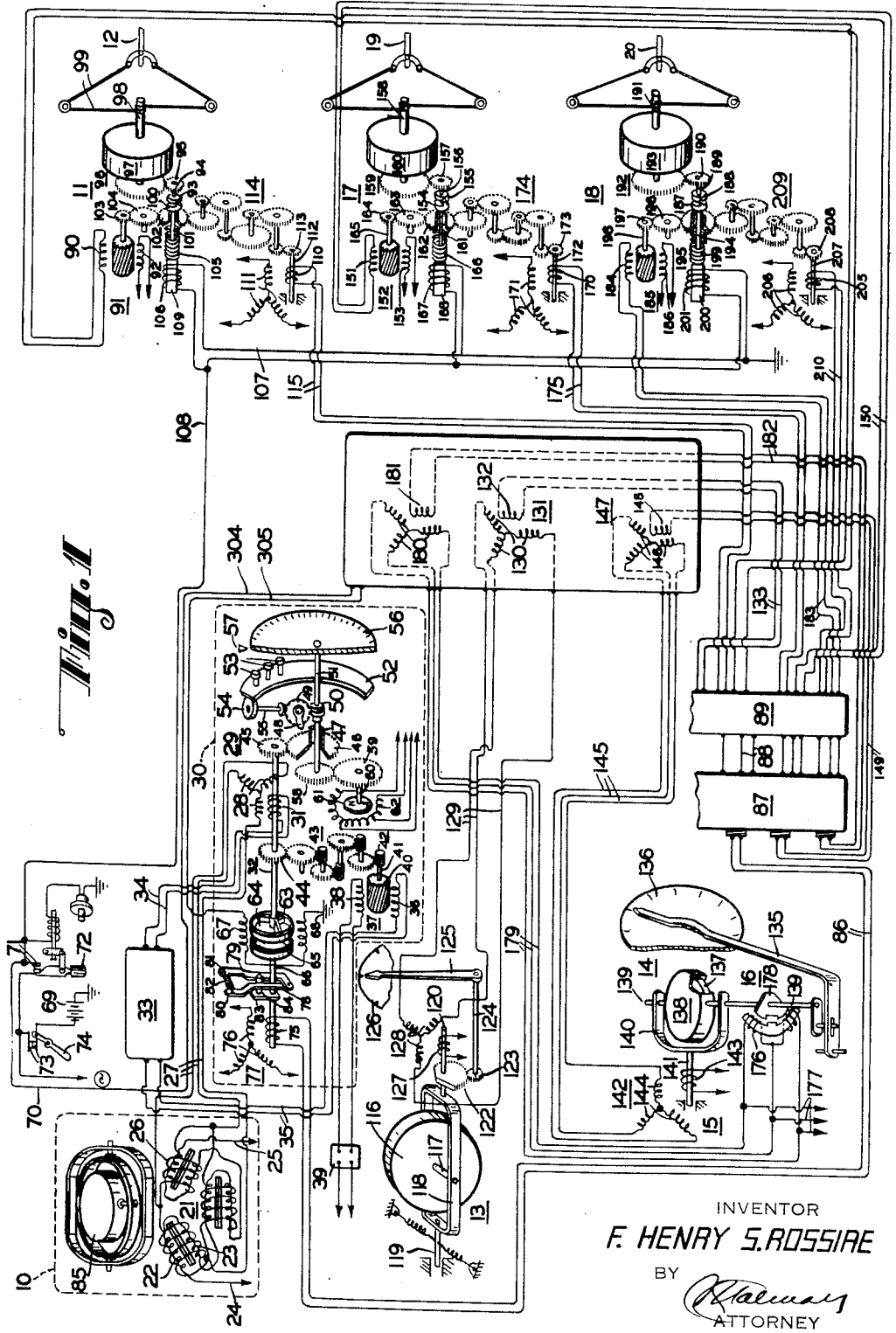
Figure 1 is a diagrammatic illustration of an automatic steering system for mobile craft embodying the novel automatic trim and/or turn control unit of the present invention.

Referring now to the drawings for a more detailed description of the present invention and more particularly to Figure 1 thereof, it is there shown as embodied in an all electric automatic pilot providing three axes of control, claimed and described more fully in copending application Serial No. 516,488 filed December 31, 1943.

The automatic pilot, as shown, comprises a magnetic field pick-up device, generally designated with the reference character 10, in the form of a gyro-stabilized earth inductor compass, for generating an electrical signal during craft deviation, for energizing a rudder servo system 11 to actuate a rudder 12; a rate of turn responsive gyro 13 adapted for generating an electrical signal proportional to the rate of turn which is superimposed upon the direction signal to modify the energization of the rudder servo system 11; and an artificial horizon gyro 14 having bank and pitch take-offs 15 and 16 for generating signals in proportion to the bank and pitch of the craft for energizing aileron and elevators 19 and 20.

As pointed out more fully in copending application Serial No. 516,488, the magnetic field pick-up device for generating an electrical signal proportional to the amount of craft deviation from a prescribed course comprises a triangular element 21 having three laminated legs, each of which is provided with a pair of exciting or primary windings 22, 23 connected in series opposed relation with each other and with a suitable source of alternating current (not shown) by way of leads 24 and 25. Wound in inductive relation to the first coils, is a delta connected coil 26, which may be termed the secondary winding of the device. Coil 26 is provided with three taps for connecting it by way of leads 27 with a three phase wound stator 28 of an inductive coupling device 29 suitably mounted within a master indicator 30.

Coupling device 29 is provided with an angularly movable rotor 31 inductively associated with the stator windings 28 and carried by a shaft 32 for angular motion relative thereto. Winding 31 is connected to the input of a conventional vacuum tube amplifier 33 by way of leads 34, the output of the amplifier feeding by way of leads 35 to one phase winding 36 of a two phase induction motor 37, the second phase winding 38 of which connects with a source of A. C. current through a suitable frequency doubler 39, the latter also being provided with a conventional phase shifting network to maintain the voltages within the two phase windings substantially 90° apart as is known in the use of such motors.

Motor 37 has a rotor 40 carried by a shaft 41 provided at its outer end with a pinion 42 adapted for driving through a speed reduction gear system 43, a gear 44 fastened to rotor shaft 32. A gear 45, supported by the free end of shaft 32, meshes with a gear 46 having connected thereto or formed integrally therewith a hollow shaft 47 supporting by way of an arm 48 the shaft of a worm 49 which meshes with a worm 50 formed or carried by a spindle shaft 51 which is received within hollow shaft 47. An annular compensator 52 having a series of adjusting screws 53 in engagement therewith is contacted by a follower 54 supported by an arm 55 fastened to the shaft of worm 49. Thus, in addition to motion imparted by rotor shaft 32 to spindle shaft 51, the latter is moved a small angular amount in one direction or another depending upon the contour of element 52 engaged by follower 54.

An indicating dial 56 is mounted on one end of spindle shaft 51 for cooperation with a fixed index 57 while the opposite end of the spindle is provided with a gear 58 for meshing with a gear 59 carried by a shaft 60 supporting a magnetic rotor 61 thereon which is magnetically coupled with a stator winding 62 of an electromagnetic transmitter, the latter being adapted for connection to a similar device as a receiver located at a remote station to reproduce the indication of heading.

The free end of rotor shaft 32 carries through a resilient supporting member 63 a clutch face 64, a cooperating clutch face 65 being supported by a shaft 66, both clutch faces being formed of magnetic material. A coil 67 surrounds the clutch faces and has one end thereof grounded as at 68 and the other end thereof connected with a battery 69 by way of a pair of series connected normally closed control switches at the novel controller unit hereof to be hereinafter described, a lead 70, contacts 71 of a servo clutch switch 72 and contacts 73 of a power switch 74.

Upon closing of switches 72 and 74 as well as the control switches at the controller unit, coil 67 is energized and clutch faces 64, 65 are brought into driving engagement whereby any motion of shaft 32 is immediately transmitted to shaft 66 which also supports thereon for angular motion therewith, a rotor winding 75 inductively associated with a three phase wound stator 76 of an inductive transmitting device 77.

In order to obtain automatic synchronization of controls, two lever arms 78 and 79 are provided within the master direction indicator which are pivoted on fixed pins 80 and 81 and interconnected through a resilient member 82 anchored to both arms slightly below pivot pins 80 and 81. A bracket 83 is fastened to shaft 66 and is provided with a pin 84 positioned in between arms 78 and 79 so that upon clockwise rotation of shaft 66, for example, pin 84 will move arm 79 outwardly when a turning torque is exerted on shaft 66, spring 82 returning the arm and pin as well as shaft 66 to neutral when the torque is no longer applied, that is, when the clutch is disengaged, while upon a counterclockwise rotation of shaft 66, pin 84 urges arm 78 outwardly, the arm returning pin 84 and shaft 66 to neutral under the action of spring 82 when the turning torque is released. By means of the foregoing provision, rotor winding 75 of transmitter 77 will always be urged to and maintained at an electrical zero or null prior to the engagement of the automatic steering system. With this provision notwithstanding the amount of craft change of course, once the craft is placed on a desired course and the automatic pilot is engaged, rotor winding 75 will only have a signal generated therein of an amount proportional to the angle of deviation by the craft from the desired course.

Element 21 of the magnetic field pick-up device together with its primary and secondary windings is stabilized and maintained in a horizontal plane by means of a stabilizing gyroscope or gyro vertical, generally designated with the reference character 85 so that a compass is provided in which, for all practical purposes, turning and acceleration errors are eliminated.

Upon a craft departure from a prescribed course, the voltages induced within coil 26 of the pick-up device are varied to vary the voltages at coupling stator 28 whereby a signal is induced within rotor winding 31, proportional to the amount of craft departure from its course, which is amplified within amplifier 33 to energize phase winding 36 of motor 37, the second phase being continuously energized from the source of alternating current. Rotor 40 of motor 37 drives shaft 32 and rotor winding 31 to a null position, i. e., one wherein the electrical axis of the rotor winding is perpendicular to the resultant magnetic field of the stator windings, whereupon the induced signal drops to zero and motor 37 is de-energized. At the same time, assuming clutch faces 64, 65 to be in driving engagement, rotor winding 75 of transmitting device 77 is moved angularly relative to stator windings 76 and a signal is induced therein proportional to the amount of craft departure from its prescribed course.

The electrical signal thus generated within rotor winding 75 is fed by suitable leads 86 to the input of a servo vacuum tube amplifier 87 and out therefrom by way of outlet leads 88 through a servo adapter 89 to energize one phase winding 90 of an induction motor 91, the second phase winding 92 of which is continuously energized from the craft's source of A. C. current.

A driving connection between motor 91 and rudder 12 is established by way of a servo clutch comprising a clutch face 93 mounted upon a shaft 94 carrying a pinion 95 for engagement with a speed reduction gear system 96 supported within a stationary servo casing 97 for driving a rudder shaft 98 connected by means of cables 99 with rudder 12, and a second clutch face 100 fastened to a shaft 101 keyed to a gear 102 but adapted for longitudinal motion relative thereto, gear 102 connecting with a pinion 103 of motor 91 through an idler gear 104. The free end of shaft 101 has an enlarged portion defining an abutment for one end of a spring member 105, the other end of which rests against gear 102.

The actuating means for axially moving shaft 101 to the right to force clutch face 100 to drivably engage clutch face 93 comprises a solenoid coil 106 grounded at one end by way of a lead 107 and connected to one of contacts 71 of servo clutch switch 72 by way of a lead 108. With switch 72 closed, a core 109 of the solenoid is urged to the right against the action of spring 105 to axially move shaft 101 therewith to provide engagement of the clutch faces so that motor 91 drives rudder 12.

In driving gear 102, motor 91 also angularly displaces a rotor winding 110 of an inductive follow-back device having a three phase wound stator 111, the rotor being supported by a shaft 112 having a pinion 113 which is drivably connected to gear 102 through a speed reduction gear train 114. Displacement of rotor winding 110 relative to stator windings 111 during operation of motor 91 generates an electrical follow-back signal which is fed by means of leads 115 to amplifier 87 through servo adapter 89 to be impressed upon the direction signal within the amplifier to thereby modify the operation of the motor. The follow-back signal opposes the direction signal and at such times that the follow-back signal is equal and opposite to the direction signal motor 91 becomes de-energized.

As the craft departs from its prescribed course it develops a certain amount of angular velocity which is also taken into account in the control of rudder 12. To this end the rate gyro 13 is provided which comprises a rotor 116 having normally horizontal spin axis supported by way of inner trunnions 117 within a gimbal ring 118, the latter being mounted upon a rigid support by way of trunnions 119 and 120 for oscillation about a second horizontal axis perpendicular to the spin axis. Resilient members 121 secured to trunnion 119 yieldably restrain gyro precession during turn to a rate of turn function. Trunnion 120 of gyro 13 carries a gear sector 122 for meshing with a pinion 123 mounted on a spindle shaft 124 carrying an indicator 125 adapted for cooperation with a scale 126, as well as a rotor winding 127 inductively coupled with a three phase wound stator 128 of an inductive device, the rotor being connected for energization by the craft's source of A. C. current.

The windings of stator 128 connect by way of leads 129 with a three phase wound stator 130 of an inductive receiver device 131 (arranged at the novel controller unit to be presently described) likewise provided with a rotor winding 132 which is connected to adapter 89 by way of leads 133 to be there superimposed upon the follow-back signal to further modify the operation of motor 91 when the craft departs from a predetermined course. Due to such departure, the induced voltages within stator 128 vary causing a corresponding change in the voltages of stator windings 130 whereupon a signal proportional to the rate of turn is generated within rotor winding 132 to be algebraically added to the direction and follow-back signals energizing phase winding 90 of motor 91.

With the above arrangement, during an initial departure of the craft from a prescribed course, the rate signal adds with the direction signal and opposes the follow-back signal to hasten outward movement of rudder 12. The rudder is operated until the follow-back signal equals and opposes the rate and direction signals whereupon the motor is de-energized and the rudder has reached a definite outward position. The applied rudder causes the craft to come to a stop and swing back to its prescribed course at which time the rate signal drops to zero and then builds up again in an opposite direction to oppose the direction signal, which now diminishes, but adds to the follow-back signal until the rudder is returned to a neutral position at which time rotor winding 110 of the follow-back device is driven to a null and the follow-back signal drops to zero.

Except for the absence of the rate signal, substantially the same action takes place at the other two control axes of the craft. To this end, gyroscope 14 comprises an artificial horizon which may have a horizon bar 135 mounted for up and down movement relative to a mask 136 for designating craft pitch, the mask, in turn, being adapted for angular movement relative to the bar for designating craft bank. The gyroscope comprises an electrically driven rotor 137 having normally vertical spin axis mounted within a rotor bearing frame 138 provided with inner trunnions 139 mounting the rotor and frame within a gimbal ring 140 for oscillation about a first horizontal axis, the gimbal having an outer trunnion 141 mounting it for oscillation about a second horizontal axis perpendicular to the first.

Bank take-off 15 comprises an inductive transmitter device 142 having a rotor winding 143 carried by outer trunnion 141 and energized from the craft's source of A. C. current, rotor 143 being inductively coupled with a three phase wound stator 144 which connects by way of leads 145 with a three phase wound stator 146 of an inductive receiver device 147 (likewise arranged at the novel turn control unit to be presently described) having a rotor winding 148 inductively coupled therewith so that any change of voltages caused within stator 144 due to angular movement of rotor winding 143 creates a like change in the voltage of stator 146 whereby a signal is induced within rotor winding 148 proportional to the amount of craft bank.

The signal induced within rotor winding 148 is fed into amplifier 87 by way of leads 149 and fed out therefrom through servo adapter 89 by outlet leads 150 to one phase winding 151 of a two phase induction motor 152, the second phase winding 153 of which is continuously energized from the craft's source of A. C. current. Motor 152 constitutes a part of the aileron servo system 17 and a driving connection is established between it and ailerons 19 through a solenoid operated clutch which comprises two clutch faces 154 and 155, the latter being carried by a shaft 156 provided with a pinion 157 thereon for driving aileron shaft 158 through a speed reduction gear system 159 supported within a stationary casing 160, and clutch face 154 being carried by a shaft 161 which has a gear 162 keyed thereto but is adapted for axial movement relative thereto. Gear 162 is driven by motor 152 through an idler 163 which meshes with a pinion 164 carried by a motor shaft 165.

Clutch faces 154 and 155 are normally held disengaged by virtue of a resilient spring 166 which abuts gear 162 at one of its ends and an enlarged portion of shaft 161 at its other end to urge the latter shaft to the left. The actuating means for axially moving shaft 161 to the right to force clutch face 154 to drivably engage clutch face 155 comprises a solenoid coil 167 which is connected to conductor 107 at one end to ground and at its other end to contacts 71 of switch 72 by way of lead 168. With switch 72 in its "on" position, i. e., with contacts 71 engaged, coil 167 is energized to urge a core 168 to the right against the action of spring 166 whereupon shaft 161 is moved to the right to bring clutch faces 154 and 155 into engagement whereby a driving connection is established between motor 152 and ailerons 19.

In driving gear 162, motor 152 also angularly displaces rotor winding 170 of an inductive follow-back device having a three phase wound stator 171, the rotor winding being inductively coupled with the stator and being carried by a shaft 172 having a pinion 173 thereon which drivably connects with gear 162 through a speed reduction gear train 174. Displacement of the rotor winding relative to stator 171 during operation of motor 152 generates an electrical follow-back signal which is fed by way of leads 175 to amplifier 87 through servo adapter 89 to be impressed upon the bank signal within the amplifier to thereby modify operation of motor 152. The follow-back signal opposes the bank signal and at such time that the follow-back signal is equal and opposite to the bank signal motor 152 becomes de-energized.

Pitch take-off 16 comprises an inductive transmitter device having stator windings 176 provided with three taps, the windings being energized from the craft's source of A. C. current by virtue of leads 177. A rotor 178 in the form of a magnetic vane is inductively associated with the stator and is secured to inner trunnion 139 for angular movement relative to the stator windings. Stator windings 176 connect by way of leads 179 with a three phase wound stator 180 of an inductive receiver device (also arranged at the novel controller unit to be presently described) having a rotor winding 181 inductively associated therewith so that any change in voltages caused within stator windings 176 due to angular movement of rotor 178 creates a like change in the voltages of stator 180 whereby a signal is induced within rotor 181 proportional to the amount of craft pitch.

The signal induced within rotor winding 181 is fed by leads 182 to amplifier 87 and out therefrom through adapter 89 by way of leads 183 to one phase winding 184 of a two phase induction motor 185, the second phase winding 186 of which is continuously energized from the craft's source of A. C. current.

Motor 185 constitutes a part of the elevator servo system 18 and a driving connection is established between it and elevator surfaces 20 through a solenoid operated clutch which comprises two clutch faces 187 and 188, the latter being carried by a shaft 189 provided with a pinion 190 thereon for operating elevator driving shaft 191 through a speed reduction gear system 192 supported within a stationary casing 193, and clutch face 187 being carried by a shaft 194 which has a gear 195 keyed thereto but is adapted for axial movement relative thereto. Gear 195 is driven by motor 185 through an idler 196 which meshes with a pinion 197 carried by a motor shaft 198.

Clutch faces 187 and 188 are normally disengaged by virtue of a resilient spring 199 which abuts gear 195 at one of its ends and an enlarged portion of shaft 194 at its other end to urge the latter shaft to the left. The enlarged end of shaft 194 is engaged by a core 200 of a solenoid whose coil 201 is grounded at one end by being tapped to lead 107 and its other end is connected by way of lead 108 to one of contacts 71 of switch 72. With the switch in its "on" position, i. e., with contacts 71 engaged, coil 201 is energized to urge core 200 to the right whereupon shaft 194 is moved to the right to bring clutch face 187 into engagement with clutch face 188 whereby a driving connection is established between motor 185 and elevators 20.

In driving gear 195, motor 185 also angularly displaces a rotor winding 205 of an inductive follow-back device having a three phase wound stator 206, the rotor being inductively coupled with the stator and supported by a shaft 207 having a pinion 208 which is drivably connected to gear 195 through a speed reduction gear train 209. Displacement of rotor winding 205 during operation of motor 185 generates a follow-back signal which is fed by way of leads 210 to amplifier 87 through servo adapter 89 to be impressed upon the pitch signal within the amplifier to thereby modify operation of motor 185. The follow-back signal opposes the pitch signal within the amplified to thereby modify operation of motor 185. The follow-back signal opposes the pitch signal and at such time that the follow-back signal is equal and opposite to the pitch signal motor 185 becomes de-energized.

With servo clutch switch 72 in an open or "off" position, even though power switch 74 is closed, coil 67 of the magnetic clutch within master indicator 30 is deenergized so that clutch face 64 is disengaged from clutch face 65 and simultaneously solenoid coils 106, 167 and 201 of the rudder, aileron and elevator servo systems are de-energized whereby motors 91, 152 and 185 are disconnected from their respective control surfaces so that subsequent control of the rudder, aileron and elevator surfaces may be performed manually in the conventional manner.

Figure 2:
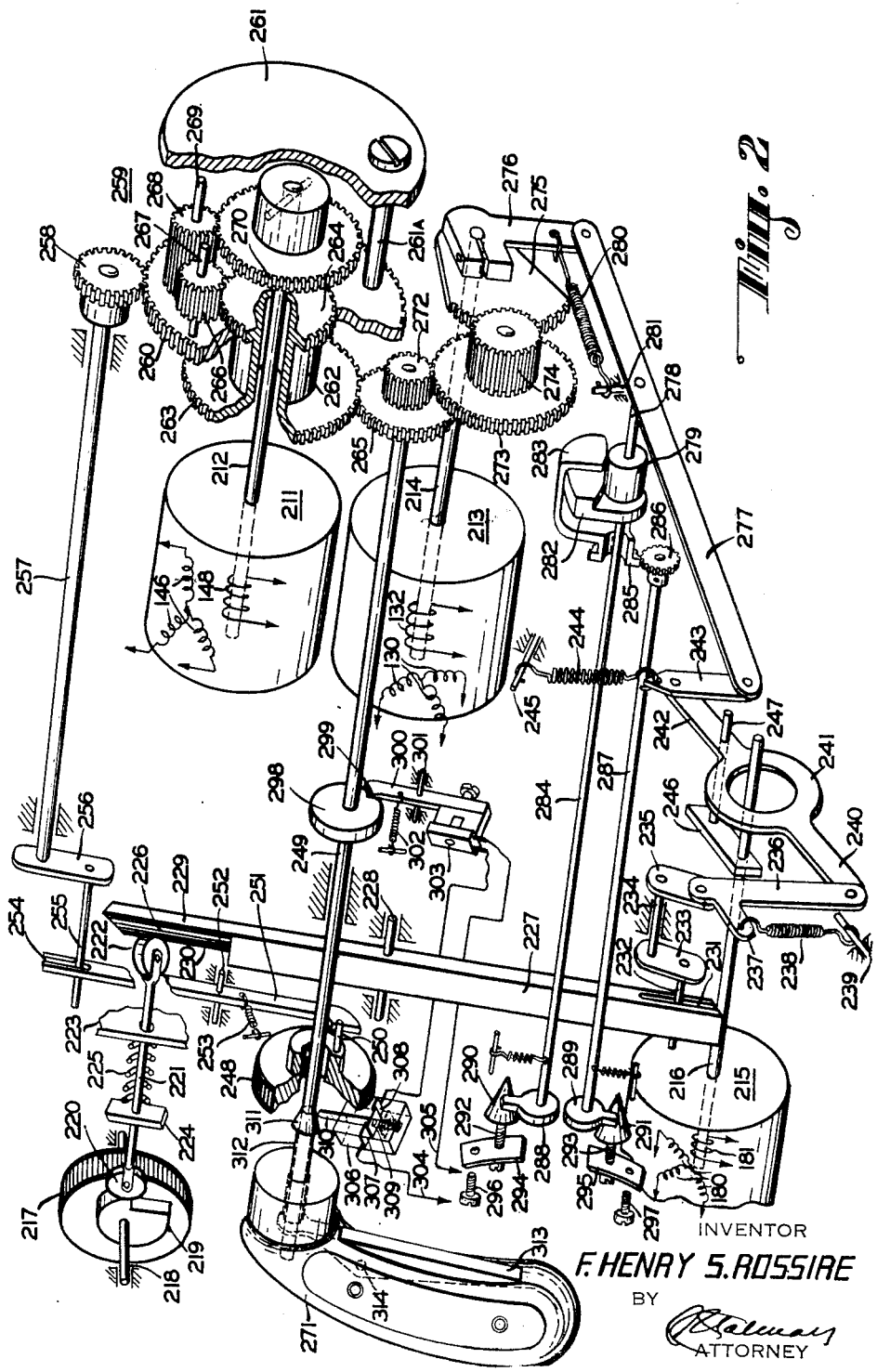
Figure 2 is a detailed schematic illustration of the novel trim and/or turn controller unit of the present invention.

Coming now to the novel automatic trim and/or turn controller unit constituting the subject matter of the present invention, the latter is shown schematically in Figure 2 as embodying an inductive bank device 211 having the wound stator 146 of Figure 1 and the inductively coupled rotor 148 carried by a shaft 212, an inductive rate device 213 having the wound stator 130 of Figure 1 and the inductively coupled rotor 132 carried by a shaft 214, and an inductive pitch device 215 having the wound stator 180 of Figure 1 and the inductively coupled rotor 181 carried by a shaft 216.

For the purpose of displacing rotor 181 of the pitch device 215 relative to its stator 180 to thereby generate a signal for energizing the elevator servo system 18 to trim the craft in pitch, a pitch trim knob 217 is provided having a shaft 218 and carrying a cam 219 thereon for motion therewith. The shaft is arranged in such a manner that adjustment of knob 217 is obtained about an axis parallel with the axis of oscillation of the elevator. With the elevators in a centered or neutral position, a roller 220 rests against cam 219 at a point substantially representing a midpoint between the low and high points of the cam, the roller being rotatably supported by one end of a reciprocally movable rod 221 whose other end rotatably supports a second roller 222 thereon. Rod 221 passes through an apertured and relatively fixed plate 223 and carries a stop element 224 fixed thereto, a spring member 225 being provided between plate 223 and element 224 for urging roller 220 into intimate contact with the periphery of cam 219.

Roller 222 is in engagement with a cam surface 226 carried by a lever 227 mounted for pivotal motion by way of a pin 228, the cam surface being formed by milling one end of the lever until a triangular cross section is acquired. By riding toward a high surface 229 of the cam, roller 222 will move lever 227 in one direction about pivot 228 and by riding toward a low surface 230 of the cam the roller will move the lever in an opposite direction about its pivot.

The free end of lever 227 is provided with a slot 231 which receives therein a pin 232 fixed to a link 233 which connects through a shaft 234, journalled within a fixed bearing, with a link 235. The latter link pivotally connects with a lever 236 having a finger 237 engageable by one end of a spring 238 which is anchored at its opposite end to a fixed pin 239, the function of the spring being to yieldably maintain cam surface 226 of lever 227 in engagement with roller 222. The free end of lever 236 pivotally connects with an arm 240 of a yoke member 241, the other arm 242 of which pivotally connects with a link 243 which is engaged by one end of a spring 244, the opposite end of the latter being anchored to a fixed pin 245. Rotor shaft 216 carries a lever 246 which carries a pin 247 loosely mounted in arm 242 of the yoke member.

In order to provide pitch trim, therefore, knob 217 is displaced angularly together with its shaft 218, which is journalled within fixed bearings, and cam 219 whereupon roller 220 is caused to linearly displace rod 221 against the yieldable action of spring 225. As a result of linear displacement of the rod, roller 222 rides upon or down on cam surface 226 to move lever 227 in one direction or another about pivot 228, the latter angularly displacing links 233 and 235 through pin 232. Angular motion of link 235 manifests itself in up or down movement of lever 236 whereupon yoke member 241 is moved up or down about a then fixed pivot defined by the connection between arm 242 and link 243 to angularly displace shaft 216 and rotor winding 181 through the connection defined by lever 246 and pin 247. Depending upon the direction of displacement of rotor 181 relative to its stator either an up-elevator or a down-elevator signal is developed in the former for elevator trim and communicated through amplifier 87 to the elevator servo system 18.

For the purposes of displacing rotor winding 148 of the inductive bank device 211 relative to its stator 146 to thereby develop a signal for energizing the aileron servo system 17 to trim the craft in bank, a bank trim knob 248 is loosely sleeved on a turn shaft 249 and is provided with a pin 250 for engagement with one end of a lever 251 mounted for pivotal motion by way of a pin 252 journalled within a fixed bearing. A spring member 253 normally urges lever 251 into engagement with pin 250 and the opposite end of the lever is provided with a slot 254 which receives a pin 255 therein fastened to a link 256, the latter being carried by a shaft 257 which is journalled within suitable bearings, the free end of the shaft carrying a pinion 258 thereon.

Movement of bank trim knob 248 is communicated to rotor winding 148 through a differential gear system 259 which comprises a cage defined by a pair of spaced parallel annular members 260 and 261 which are interconnected with each other through one or more bolts 261a. Member 260 is formed with a toothed periphery for drivable engagement by pinion 258 and is sleeved about a hollow shaft 262 carrying gears 263 and 264 at each of its ends, gear 263 meshing with a gear 265 fixed to the free end of turn shaft 249 and gear 264 meshing with a pinion 266 which is rotatably mounted by way of a shaft 267 journalled within members 260 and 261. Pinion 266, in turn, meshes with a second pinion 268, which is rotatably mounted by way of a shaft 269, also journalled within members 260 and 261, the latter pinion drivably engaging a gear 270 fixed to the free end of rotor shaft 212, the latter shaft passing through hollow shaft 262.

Thus, movement of bank trim knob 248, in one direction or another, displaces lever 251 about its pivot 252 to oscillate pin 255 and thereby angularly displace shaft 257 whereupon pinion 258 drives member 260. Since gear 265, at this point, is locked against rotation by shaft 249, movement of member 260 causes pinion 266 to creep on gear 264. The pinion, in creeping, drives pinion 268 which, in turn, drives gear 270 and shaft 212 therewith to angularly displace rotor 148 relative to its stator. The signal induced within the rotor is fed to the amplifier and out therefrom to aileron servo system 17 for bank trim.

In order to place a shaft provided with the all electric, automatic pilot hereinabove described into an automatic turn, turn shaft 249 is provided with an elongated handle 271 of a pistol grip type which, when displaced, angularly displaces wound rotors 132, 148 and 181 of the rate, bank and pitch devices 213, 211 and 215, to thereby provide the correct rudder, aileron and up-elevator signals for the turn selected, such signals being developed independently of the master instruments 10, 13 and 14 normally controlling the automatic steering system hereof.

Displacement of pistol grip handle 271 causes displacement of shaft 249 and gear 265 secured thereto. As a result of such displacement, gear 265 drives gears 263 and 264, the latter rotating pinion 266, member 260 being locked against rotation at this point by pinion 258 operable from bank trim knob 248. Pinion 266 drives pinion 268 which, in turn, drives gear 270 to displace rotor 148 and thereby develop therein the required aileron signal for the selected turn.

In addition to rotating gear 265, turn shaft 249 also rotates a pinion 272 secured thereto which meshes with a gear 273 having a pinion 274 fastened thereto and in driving engagement with a gear sector 275 which is fastened to shaft 214. Thus, motion of shaft 249 likewise causes displacement of wound rotor 132 relative to its stator so that a signal is developed within the rotor for communication to the rudder, the signal being of the character required for proper rudder displacement for the turn selected.

Also secured to shaft 214 for movement during motion of sector 275 is a link 276 which pivotally connects with a lever 277, the free end of which is pivotally connected to the free end of link 243. A midpoint of the lever is provided with a pin 278 supporting a roller 279 thereon, the roller being yieldably urged into engagement with a pitch cam adjustment system to be presently described by way of a spring member 280 anchored at one end to link 276 and at its other end to a fixed pin 281. Motion of pinion 272, therefore, causes displacement of link 276 in either direction to move lever 277 to the left or right but because of its engagement with the pitch cam system, the opposite end of the lever always moves downwardly to move link 243 therewith and thereby displace yoke member 241 downwardly about a then fixed pivot defined by the connection of lever 236 and arm 240. In this manner, rotor 181 is displaced relative to its stator to provide the correct up-elevator signal for either direction of turn selected by handle operation.

The pitch cam adjustment system referred to above is provided to insure proper initial setting of lever 277 whereby for given rates of turn in either a left or right direction enough displacement of rotor 181 will be provided to maintain the craft in level attitude during turn, i. e., to prevent a nose-heavy or loss of attitude condition during a given turn. The adjustment comprises the roller 279 carried by lever 277 which is urged into engagement with a pair of cams 282 and 283, the former being fixed to a shaft 284 and the latter being hollow and sleeved on the shaft and provided with a gear 285 for meshing with a pinion 286 carried by a second and parallel shaft 287. Adjustment of the two cams defines the limit of downward throw of roller 279 for a given left or right motion of lever 277 and consequently the amount of displacement of rotor 181 for a given set turn. Shafts 284 and 287 are provided at their free ends with collars 288 and 289 having lugs normally yieldably urged into engagement with longitudinally movable cones 290 and 291 engaged by adjusting screws 292 and 293. The screws are provided with straps 294 and 295 which normally lock screws 292 and 293 in a given position but upon loosening of other screws 296 and 297, the straps are actuated to unlock screws 292 and 293 and adjustment thereof will urge the cones relative to the lugs whereby shafts 284 and 287 are displaced angularly to set cams 282 and 283.

In addition to driving gear 265 and pinion 272, turn shaft 249 also displaces an annular notched disc 298 within whose notch normally rests a detent 299 carried by an arm 300 pivoted at 301 and yieldably urged to engage the notch by means of a yieldable member 302. When turn shaft 249 is displaced angularly, arm 300 is urged outwardly whereupon detent 299 leaves the notch while the opposite end of the arm, provided with a contact (not shown) is moved downwardly to open a pair of contacts (not shown), arranged within a conventional switch box 303, which normally connect coil 67 of the magnetic clutch 64, 65 at the master indicator with battery 69 through conductors 304, 305. Opening of the contacts within box 303 by angular displacement of shaft 249, therefore, de-energizes coil 67 so that direction signal from the inductor compass is disconnected during a turn from the rudder servo channel at which time the latter channel is energized by the signal developed within rotor 132 of device 213.

In response to initial displacement of turn shaft 249 signals are immediately available within rotors 148, 132 and 181 for aileron, rudder and elevator control but some small time interval elapses prior to the opening of the contacts within switch box 303 so that the inductor compass will still control rudder, such time interval arising due to the fact that a given angular movement of shaft 249 is required before the switch is opened. As a result, aileron and elevator surfaces will be deflected to cause the craft to crab momentarily before the switch is opened to de-energize coil 67 and thereby disconnect the rudder from the compass at which time rotor 132 takes over to control rudder deflection resulting in uneven craft flight.

To the end that smoother flight as well as finer rudder trim may be obtained, a second switch 306 is provided connected in series with switch 303, the former comprising a pair of contacts 307 and 308 normally closed by a bridging contact 309 yieldably urged to a closed position and carried by a post 310 extending outwardly from the switch into engagement with the conical end 311 of a hollow shaft 312 sleeved about turn shaft 249. The free end of shaft 312 is fastened to a trigger 313 pivoted at 314 within pistol grip 271 which, when depressed by the pilot as he grasps the handle, urges shaft 312 outwardly so that conical end 311 depresses post 310 to open the switch contacts so that coil 67 is de-energized as soon as the handle is grasped and the trigger depressed. Thus signals to rudder, aileron and elevator control surfaces are communicated immediately as the handle is displaced providing smoother flight in turn than that heretofore available. After a given displacement of the handle, switch 303 is likewise opened so that during the turn the trigger may be released so that switch 306 will again be closed but since switch 303 is opened the coil 67 will remain de-energized until handle 271 is centered at the completion of craft turn.

It will now be apparent that by grasping pistol grip 271 and depressing trigger 313, the inductor compass will be disconnected from the rudder and that bank, rate and pitch signals are developed in inductive devices 211, 213 and 215 independently of their respective master instruments whereby the aileron, rudder and elevator surfaces are deflected the proper amount to place the craft in a turn attitude, surface deflection continuing until the follow-back signals of inductive devices 110—111, 170—171, and 205—206 (Figure 1) are equal and opposite to the bank, rate and pitch signals of devices 211, 213 and 215. As the correct craft attitude is attained, signals are generated by the master instruments, i. e., bank take-off 15, rate take-off 127—128 and pitch take-off 16 to wash out the signals developed by devices 211, 213 and 215. The follow-back signals, at this point, being at a maximum act alone in reversing servo systems 11, 17 and 18 to center the rudder, aileron and elevator surfaces, the craft remaining in the desired banked attitude. Moreover, should the craft depart from such attitude the master instruments will operate to return the craft to the desired attitude. Once the new course is attained, turn handle 271 is centered manually to set the craft on the new course and switches 303 and 306 are closed to energize coil 67 of clutch 64, 65 of the master compass indicator whereby the compass takes over and maintains control of the rudder.

One practical embodiment of a controller unit for operating the novel mechanism of Figure 2 is shown in Figures 3 and 4 and, as there illustrated, a housing 320 is provided for enclosing the mechanism of Figure 2 which is supported by a casing (not shown) arranged within the housing and having a flange 321 provided with openings 322 for securing the unit to the craft either in a horizontal or vertical plane as desired. Secured to the upper front end of housing 320 is a hollow outwardly extending arm 323 supporting at its outermost end a pitch trim knob 324, corresponding to knob 217 of Figure 2, for angular motion therein about an axis parallel to the craft transverse axis and the axis of elevator control. This arrangement is of aid to the human pilot since movement of the pitch trim knob will be the same as the movement imposed on the elevator by a conventional control column, i. e., rotation of knob 324 toward the pilot will provide an up-elevator condition while rotation of the knob away from the pilot will provide a down-elevator condition.

Inscribed at the outer end of arm 323 is an index marker 325 which cooperates with an index 326 inscribed on the outer periphery of the knob, a no signal condition for rotor 181 and a neutral or central position for elevator 20 being manifested by alignment of markers 325 and 326. Downward motion of knob 324 and its marker 326 relative to fixed marker 325 angularly displaces rotor 181 of device 215 to provide an up-elevator trim condition in the manner described in connection with Figure 2 while upward motion of knob 324 and its marker relative to marker 325 displaces rotor 181 in an opposite direction to provide a down-elevator trim condition.

Mounted for angular displacement about a central axis of housing 320 is a hollow bank trim knob 327 which corresponds to trim knob 248 of Figure 2, the knob being provided with an index 328 for cooperation with a fixed index 329 carried by a bracket 330 fastened to flange 321. Motion of knob 327 in one direction relative to index 329 displaces rotor 148 to provide right bank or aileron trim while motion of the knob in the opposite direction to the index displaces the rotor to provide left bank or aileron trim, coincidence between indices 328 and 329 indicating a no signal condition for rotor 148 and a centered or neutral position for the ailerons. Fixed with respect to casing 320 is a pin 331 which extends into knob 327 to be engaged by one or the other of pins 332 or 333 carried by the knob and thereby define a limit of motion for the knob in either direction of rotation.

Bracket 330, moreover, rotatably supports a shaft therein corresponding to turn shaft 249 of Figure 2 which passes through knob 327, the free end of the shaft passing through a sleeve 334 and having a pistol grip handle 335, corresponding to handle 271 of Figure 2, attached thereto. The inner side of the handle is apertured to accommodate a trigger 336, corresponding to trigger 313 of Figure 2, in the manner and for the purpose described in connection with the arrangement of Figure 2.

Motion of pitch trim knob 324 in one direction or another about an axis parallel to the axis of elevator motion displaces rotor 181 of device 215 to develop a signal therein for elevator trim. Motion of bank trim knob 327 in one direction or another about an axis parallel to the craft fore and aft axis provides displacement of rotor 148 of device 211 to develop a signal therein for left or right bank trim. By grasping handle 325 and depressing trigger 336, the compass is disconnected from the rudder channel and subsequent angular displacement of the handle provides displacement of rotors 148, 132 and 181 of devices 211, 213 and 215 whereby aileron, rudder and elevator control signals are developed therein for turning of the craft. Following a small displacement of handle 335, switch 303 is opened so that trigger 336 may be thereafter released.

The novel automatic trim and/or turn controller mechanism hereof and the automatic steering system controlled thereby is of such character that extreme flexibility of control is provided thereby which makes it possible to execute maneuvers by turning appropriate controls on the unit. For example, sharply banked turns may be made by actuation of pistol grip handle 335, the craft immediately assuming straight flight when the handle is returned to its central position. Bank and pitch trim is immediately available upon operation of knobs 324 and 327. Steep climbs or dives may be made by operating pitch trim knob 324. Also, a combination of turns and climbs or turns and dives may be executed or the craft quickly thrown from a correctly banked turn in one direction to a correctly banked turn in an opposite direction.

Although but a single embodiment of the invention has been illustrated and described in detail, it is to be expressly understood that the invention is not limited thereto. Various changes may also be made in the design and arrangement of the parts without departing from the spirit and scope of the invention, as the same will now be understood by those skilled in the art.

I claim:

1. In an aircraft automatic pilot for controlling rudder, aileron and elevator surfaces and having course change responsive means, rate of course change responsive means and attitude change responsive means, said first two named responsive means controlling said rudder, and said last-named responsive means controlling said aileron and elevator surfaces, the combination with said pilot of a controller unit therefor, said rate of course change responsive means comprising a rate of turn gyro and an electrical take-off therefor together with a repeater device connected to said take-off, said repeater device comprising a stator arranged at said unit and an angularly movable rotor inductively associated with the stator, said attitude change responsive means comprising an artificial horizon gyro and electrical bank and pitch take-offs therefor together with repeater devices connected to said bank and pitch take-offs, said repeater devices comprising stators arranged at said unit and angularly movable rotors inductively associated with the last-named stators, a bank trim knob arranged on said unit for angular motion about an axis parallel with the craft fore and aft axis for angularly moving the rotor of said bank repeater device, a pitch trim knob arranged on said unit for angular motion about an axis parallel with the craft's transverse axis for angularly moving the rotor of said pitch repeater device, an elongated pistol grip handle arranged on said unit for angular motion about an axis parallel with the craft's fore and aft axis for angularly displacing the rotors of said rate, bank and pitch repeater devices, and a trigger on said handle for disconnecting said course change responsive means from said rudder.

2. In an aircraft automatic pilot for controlling a craft rudder and having course change responsive means and rate of turn responsive means connected for actuating said rudder, said rate of turn responsive means comprising a rate of turn gyro and a take-off therefor together with a repeater connected thereto, the combination with said pilot of means comprising a pair of normally closed interconnected switches arranged between said course change responsive means and said rudder, means comprising a pistol grip handle adapted for angular motion about an axis parallel with the craft's fore and aft axis for actuating said repeater device independently of said take-off for controlling said rudder and for opening one of said switches to disconnect said course change responsive means from said rudder, and a trigger pivotally supported on said handle for movement about an axis normal to the pivotal axis of the handle for opening the other of said switches prior to angular displacement of said handle.

3. In an aircraft automatic pilot for controlling a craft rudder and having course change responsive means and rate of turn responsive means connected for actuating said rudder, said rate of turn responsive means comprising a rate of turn gyro and a take-off therefor together with a repeater connected thereto, the combination with said pilot of means comprising a pair of normally closed serially interconnected switches arranged between said course change responsive means and said rudder, a controller unit for said pilot, a substantially hollow pistol grip handle pivotally supported by said unit for angular displacement about a single axis parallel with the craft fore and aft axis whereby in response to displacement of said handle said repeater device is actuated independently of said take-off for controlling said rudder and for opening one of said switches to disconnect said course change responsive means from said rudder, said handle having an opening therein facing said unit, and means comprising a trigger pivotally mounted within the opening of said handle about an axis normal to the pivotal axis of the handle for opening the other of said switches prior to angular displacement of said handle.

4. In an aircraft automatic pilot for operating a control surface about an axis parallel with the craft's transverse axis and having a master instrument providing a signal in response to the departure by said craft from a predetermined attitude about its transverse axis together with means connected to said instrument for normally repeating said signal to actuate said surface to return said craft to said predetermined attitude, the combination with said pilot of a controller unit having an outwardly extending arm, and a pitch trim knob supported in said arm for angular displacement about an axis parallel to the axis of motion of said surface whereby in response to displacement of said knob said repeater means is actuated so that the same movement is imposed on said surface as that imposed on said knob.

5. In an aircraft automatic pilot for operating a control surface about an axis parallel with the craft's transverse axis and having a master instrument providing a signal in response to the departure by said craft from a predetermined attitude about its transverse axis together with means connected to said instrument for normally repeating said signal to actuate said surface to return said craft to said predetermined attitude, the combination with said pilot of a controller unit having an outwardly extending arm, an index marker on said arm, a pitch trim knob for actuating said repeating means supported in said arm for angular displacement about an axis parallel to the axis of movement of said surface, and an index marker on said knob for cooperation with said first index marker.

6. A pitch trim control for an automatic pilot for aircraft provided with an elevator movable about a transverse axis of the craft comprising a casing, an arm secured to said casing for extension outwardly therefrom and having a bifurcated end, a pitch trim knob rotatably mounted on said arm within said bifurcation for motion about an axis parallel to said craft transverse axis, an index on said arm, a cooperating index on said knob, means within said casing for developing a signal for actuating said elevator, and means connecting said last-named means to said knob whereby motion of the knob in one direction relative to said fixed index provides an up-elevator condition while motion of the knob in an opposite direction relative to said fixed index provides a down-elevator condition.

7. A controller unit for an automatic steering system for aircraft comprising a casing, means arranged within said casing for controlling said craft in direction, pitch and bank, means for providing a nose-up or nose-down condition for said craft comprising an elongated arm secured to said casing and extending outwardly therefrom, a trim knob for actuating said pitch control means supported at the free end of said arm for angular motion about an axis parallel with the craft transverse axis, means for providing a left bank or a right bank for said craft comprising a knob for actuating said bank control means arranged below said arm for angular motion about an axis parallel with the craft fore and aft axis, and means for providing an automatic turn for said craft comprising an elongated pistol grip handle for actuating said direction, pitch and bank control means superimposed over said last-named knob for angular motion about an axis coaxial with said last-named knob.

8. A controller unit for an automatic steering system for aircraft comprising a casing, means arranged within said casing for controlling said craft in bank, pitch and direction, means comprising a knob for actuating said bank controlling means supported on said casing for angular motion about a substantially central axis of said casing parallel with the craft fore and aft axis, means comprising an elongated arm secured to said casing and extending outwardly therefrom over said knob, a second knob for actuating said pitch controlling means supported at the free end of said arm for angular motion about an axis parallel with the craft transverse axis, and a pistol grip handle for actuating said bank, pitch and direction controlling means in unison supported on said casing below said arm for angular motion about an axis coaxial with the axis of said first-named knob.

9. A controller unit for an automatic steering system for aircraft comprising a casing, means arranged within said casing for controlling said craft in bank, pitch and direction, means comprising a knob for actuating said bank controlling means supported on said casing for angular motion about a substantially central axis of said casing parallel with the craft fore and aft axis, means comprising an elongated arm secured to said casing and extending outwardly therefrom over said knob, a second knob for actuating said pitch controlling means supported at the free end of said arm for angular motion about an axis parallel with the craft transverse axis, and an elongated pistol grip handle for actuating said bank, pitch and direction controlling means in unison and supported on said casing in spaced relation to said first-named knob for angular motion about an axis coaxial therewith and being movable in a plane substantially coincident with the plane of motion of said second-named knob.

10. Control means for the elevator surface of an aircraft comprising a signal generator for controlling said surface, an adjustable trim knob for actuating said generator, and means connecting said knob to said generator comprising a pivotally movable cam member, a reciprocally movable member for displacing said cam member, and means comprising a cam operated by adjustment of said knob for displacing said reciprocally movable member.

11. Control means for the elevator surface of an aircraft comprising a casing, a signal generator arranged within said casing for controlling said surface, a trim knob mounted for angular motion on said casing for actuating said generator, and means connecting said knob to said generator comprising a pivotally movable cam member, a reciprocally movable member for displacing said cam member, and means comprising a cam operated by angular motion of said knob for displacing said reciprocally movable member.

12. In an aircraft automatic pilot for controlling a craft surface and having course deviation responsive means connected for actuating the surface, the combination with said pilot of a turn controller therefor comprising course change means for operating the surface, a pair of normally closed serially connected switches for making the course deviation responsive means effective on said surface, a substantially hollow pistol grip handle connected to the course change means and pivotally supported by the controller for angular movement about a predetermined axis to actuate the course change means and for opening one of said switches to make the course deviation responsive means ineffective on said surface, said handle having an opening therein facing the controller, and means comprising a trigger pivotally mounted within the opening of the handle about an axis normal to the pivotal axis of the handle for opening the other of said switches.

13. In an aircraft automatic pilot for controlling rudder, aileron and elevator surfaces and having course change responsive means and turn means for controlling a selected one of said surfaces together with attitude change responsive means and bank and pitch signal generators for controlling aileron and elevator surfaces, a control mechanism being provided between the course change responsive means and the surface controlled thereby for normally operatively connecting the course change responsive means with the selected surface and being operative for disconnecting the course change responsive means from the selected surface, the combination with said automatic pilot of control means therefor comprising a pistol grip member mounted for pivotal movement about a single predetermined axis for operating said turn means and said bank and pitch signal generators to vary the course and attitude of the craft, switch means connected with said control mechanism for operating the latter, said switch means being connected for operation by movement of said pistol grip member whereby the control mechanism is operated to disconnect the course change responsive means from said selected surface, and a trigger mechanism carried by the pistol grip member operably connected with said switch means for also operating the latter to operate the control mechanism to disconnect the course change responsive means from the selected surface.

14. In an automatic pilot for controlling a craft surface and having course change responsive means and displaceable turn means connected for actuating said surface together with a control mechanism normally connecting the course change responsive means with the surface and operable to disconnect the course change responsive means from the surface, the combination with said pilot of control means comprising a pistol grip handle mounted for pivotal motion about a predetermined axis, a pair of switches operably associated with said control mechanism controlling the operation thereof to disconnect the course change responsive means from the surface, a trigger pivotally mounted on the handle for movement about an axis normal to the pivotal axis of the handle, means connecting the handle to displace the turn means and to operate one of said switches whereby said control mechanism is operated to disconnect said course change responsive means from said rudder, and means connecting the trigger to the other of said switches for operating the latter whereby said control mechanism is operated to disconnect the course change responsive means from the surface.

F. HENRY S. ROSSIRE.

REFERENCES CITED

The following references are of record in the file of this patent:

UNITED STATES PATENTS

| Number | Name | Date |
|---|---|---|
| 2,144,616 | Carlson | Jan. 24, 1939 |
| 2,351,977 | Kronenberger et al. | June 20, 1944 |
| 2,401,168 | Kronenberger | May 28, 1946 |
| 2,415,429 | Kellogg et al. | Feb. 11, 1947 |
| 2,415,430 | Frische et al. | Feb. 11, 1947 |
| 2,416,097 | Hansen et al. | Feb. 18, 1947 |
| 2,481,776 | Osborn | Sept. 13, 1949 |
| 2,516,796 | Noxon et al. | July 25, 1950 |

OTHER REFERENCES

"Handbook of Boeing Aircraft Co." (D-2664, copyrighted 1940) for maintenance of the Boeing Stratoliner, Model S-307; page 82.

"Popular Science" of June 1945; page 81.

"Electronics" of October 1945; pages 98, 99, 100, 101.